United States Patent
Xia et al.

(10) Patent No.: US 9,654,529 B2
(45) Date of Patent: May 16, 2017

(54) METHOD, APPARATUS AND SYSTEM FOR IMPLEMENTING SERVICE CONTROL OF HOME NETWORK DEVICE

(71) Applicant: Huawei Technologies Co., LTD, Shenzhen (CN)

(72) Inventors: Hui Xia, Shenzhen (CN); Zhigang Huang, Nanjing (CN); Jian Cheng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 800 days.

(21) Appl. No.: 13/928,042

(22) Filed: Jun. 26, 2013

(65) Prior Publication Data

US 2014/0012968 A1 Jan. 9, 2014

(30) Foreign Application Priority Data

Jun. 26, 2012 (CN) .......................... 2012 1 0213301

(51) Int. Cl.
*H04L 12/28* (2006.01)
*H04L 29/06* (2006.01)
*H04N 21/436* (2011.01)

(52) U.S. Cl.
CPC ............ *H04L 65/60* (2013.01); *H04L 12/282* (2013.01); *H04L 12/2809* (2013.01); *H04L 12/2814* (2013.01); *H04N 21/43615* (2013.01); *H04L 12/2832* (2013.01)

(58) Field of Classification Search
CPC .............. H04L 12/282; H04L 12/2832; H04N 21/43615
See application file for complete search history.

(56) References Cited

U.S. PATENT DOCUMENTS

| 2004/0150546 A1* | 8/2004 | Choi | H04B 1/202 341/176 |
| 2004/0208159 A1* | 10/2004 | Jung | H04L 12/2805 370/346 |
| 2007/0211734 A1 | 9/2007 | Yang | |

(Continued)

FOREIGN PATENT DOCUMENTS

| CN | 1481117 A | 3/2004 |
| CN | 1481119 A | 3/2004 |

(Continued)

OTHER PUBLICATIONS

Extended European Search Report received in Application No. 13173746.2-1862, mailed Sep. 19, 2013, 6 pages.

*Primary Examiner* — Jeong S Park
(74) *Attorney, Agent, or Firm* — Slater Matsil, LLP (57) ABSTRACT

A method, an apparatus and a system can be used for implementing service control of a home network device. A first DLNA device sends a service request to a user interface server. The first DLNA device receives a DLNA device list of the home network wherein the first DLNA device is located and a control script corresponding to a media service to be executed that are sent by the user interface server in response to the service request. The first DLNA device selects a second DLNA device from the DLNA device list and controls, according to the control script, the second DLNA device to execute the media service to be executed.

10 Claims, 7 Drawing Sheets

(56) References Cited

U.S. PATENT DOCUMENTS

| | | | |
|---|---|---|---|
| 2009/0210555 A1* | 8/2009 | Han | H04L 12/2809 709/238 |
| 2010/0095332 A1* | 4/2010 | Gran | G06F 17/30038 725/93 |
| 2010/0257455 A1 | 10/2010 | Park et al. | |
| 2010/0332565 A1* | 12/2010 | Al-Shaykh | G06F 17/30905 707/912 |
| 2011/0131520 A1* | 6/2011 | Al-Shaykh | H04L 12/281 715/772 |
| 2011/0296460 A1 | 12/2011 | Jin et al. | |
| 2012/0178426 A1* | 7/2012 | Filipov | H04L 12/281 455/414.1 |
| 2013/0159857 A1* | 6/2013 | Zaloshnja | H04L 65/605 715/716 |
| 2013/0254813 A1* | 9/2013 | Harwell | H04N 5/76 725/83 |

FOREIGN PATENT DOCUMENTS

| | | |
|---|---|---|
| CN | 1481120 A | 3/2004 |
| CN | 101656645 A | 2/2010 |
| CN | 101741901 A | 6/2010 |
| CN | 102460412 A | 5/2012 |
| WO | 2008023934 A1 | 2/2008 |
| WO | 2012057661 A1 | 5/2012 |

\* cited by examiner

METHOD, APPARATUS AND SYSTEM FOR IMPLEMENTING SERVICE CONTROL OF HOME NETWORK DEVICE

CROSS-REFERENCE TO RELATED APPLICATION

This application claims priority to Chinese Patent Application No. 201210213301.3, filed on Jun. 26, 2012, which is hereby incorporated by reference in its entirety.

TECHNICAL FIELD

The present invention relates the field of communication technologies, and in particular, to a method, an apparatus and a system for implementing service control of a home network device.

BACKGROUND

The digital living network alliance (full name: Digital Living Network Alliance, DLNA for short) is an organization formed by manufactures of consumer electronics, mobile phones and computers. The aim of the organization is to establish a set of industry standards so that products of the manufacturers are connected and adapted to each other, thereby implementing digital living for consumers. DLNA devices are set in a home network, and are connected to an operator network through network address translation (full name: Network Address Translation, NAT for short). The DLNA devices can be classified into three types based on function: a digital media server (full name: Digital Media Server, DMS for short), a digital media renderer (full name: Digital Media Renderer, DMR for short), and a digital media controller (full name: Digital Media Controller, DMC for short), where DMS is configured to store media such as a video or a picture, DMR is configured to decode media and display the decoded media, and DMC is configured to control DMS and DMR to process media services such as video playing and picture browsing.

In an existing home network, at least one DLNA device that can support the DMC function needs to be set, so that other DLNA devices can process services, thereby improving technical requirements of service support, and increasing costs and expenses.

SUMMARY

Embodiments of the present invention provide a method, an apparatus and a system for implementing service control of a home network device. An outside network device provides a service control capability for a DLNA device of the internal network at home, so as to reduce technical requirements and dependence of an operator service on the device of the internal network at home, facilitate development and deployment and centralized control of services of an operator, and reduce costs and expenses.

In order to achieve the objectives, the embodiments of the present invention adopt the following technical solutions:

A method for implementing service control of a home network device is provided, including:

sending, by a first digital living network alliance DLNA device, a service request to a user interface server, where the first DLNA device is any device inside a home network, the user interface server is a device outside the home network, and the service request carries a media service to be executed;

receiving, by the first DLNA device, a DLNA device list of the home network where the first DLNA device is located and a control script corresponding to the media service to be executed that are sent by the user interface server in response to the service request, where the control script can be used by the first DLNA device, to control the media service to be executed;

selecting, by the first DLNA device, a second DLNA device from the DLNA device list, where the second DLNA device is capable of executing the media service to be executed; and controlling, by the first DLNA device according to the control script, the second DLNA device to execute the media service to be executed.

A DLNA device is provided, including:

a sending unit, configured to send a service request to a user interface server, where the user interface server is a device outside a home network, and the service request carries a media service to be executed;

a receiving unit, configured to receive a DLNA device list of a home network where a first DLNA device is located and a control script corresponding to the media service to be executed that are sent by the user interface server in response to the service request, where the control script can be used by the first DLNA device, to control the media service to be executed;

a selection unit, configured to select a second DLNA device from the DLNA device list received by the receiving unit, where the second DLNA device is capable of executing the media service to be executed; and a service implementation unit, configured to control, according to the control script received by the receiving unit, the second DLNA device to execute the media service to be executed.

A media server is provided, including:

an acquisition unit, configured to acquire description information corresponding to a DLNA device inside a home network; and a sending unit, configured to send the description information acquired by the acquisition unit to a user interface server, so that the user interface server generates a DLNA device list of the home network and a control script according to the description information.

A user interface server is provided, including:

a receiving unit, configured to receive description information sent by a media server, where the description information is description information of DLNA devices belonging to the same home network; and a generation unit, configured to generate a DLNA device list of the home network and a control script according to the description information received by the receiving unit, where the control script is used to provide a service control function for the DLNA device inside the home network.

A system for implementing service control of a home network device is provided, including a DLNA device, a media server and a user interface server.

The DLNA device is configured to: send a service request to a user interface server, where the DLNA device is any DLNA device inside a home network, the user interface server is a device outside the home network, and the service request carries a media service to be executed; receive a DLNA device list of the home network where the DLNA device is located and a control script corresponding to the media service to be executed that are sent by the user interface server in response to the service request, where the control script can be used by the DLNA device, to control the media service to be executed; select a DLNA device capable of executing the media service to be executed from the DLNA device list; and control, according to the control script, the DLNA device capable of executing the media service to be executed to execute the media service to be executed;

The media server is configured to: acquire description information corresponding to the DLNA device inside the home network; and send the description information acquired by an acquisition unit to the user interface server, so that the user interface server generates the DLNA device list of the home network and the control script according to the description information; and The user interface server is configured to: receive the description information sent by the media server, where the description information is description information of DLNA devices belonging to the same home network; and generate the DLNA device list of the home network and the control script according to the description information received by the receiving unit, where the control script is used to provide a service control function for the DLNA device inside the home network.

The embodiments of the present invention provide the method, apparatus and system for implementing service control of a home network device. The device outside the home network provides the DLNA device list and the service control script for the DLNA device inside the home network to implement a service control capability of the DLNA device inside the home network, thereby reducing technical requirements and dependence of an operator service on the device of the internal network at home, facilitating development and deployment and centralized control of services of an operator, and reducing costs and expenses.

BRIEF DESCRIPTION OF DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DESCRIPTION OF EMBODIMENTS

The technical solutions of the present invention are clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
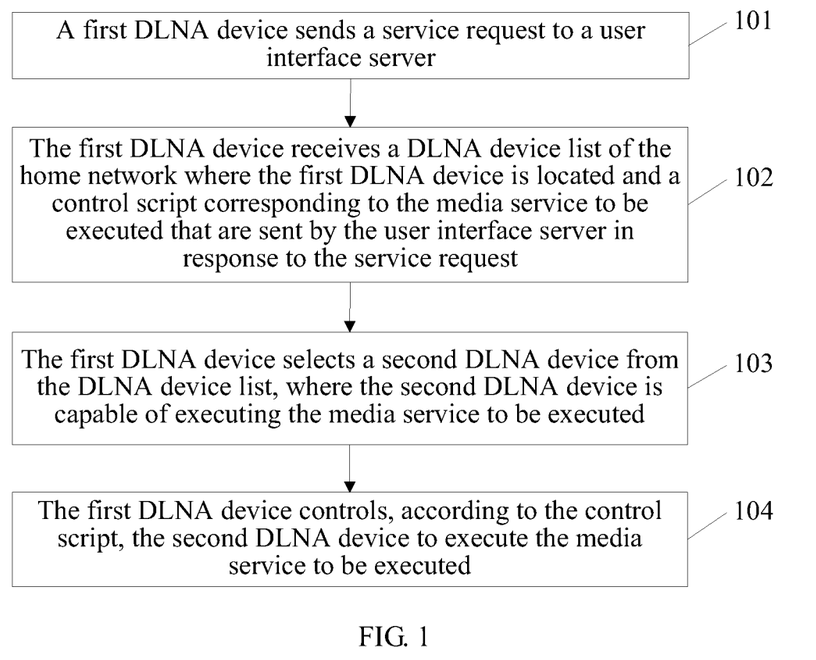
FIG. 1 is a flow chart of a method for implementing service control of a home network device in Embodiment 1 of the present invention.

An embodiment of the present invention provides a method for implementing service control of a home network device. As shown in FIG. 1, the method includes the following steps.

101: A first DLNA device sends a service request to a user interface server, where the service request carries a media service to be executed.

The first DLNA device may be any DLNA device inside the home network, and may be a device having a DLNA function such as a mobile phone, a tablet, or a desktop computer, which is not listed in detail in the embodiment of the present invention. The user interface server is a device outside the home network, set in an operator network, and configured to provide a control script and a DLNA device list for the DLNA device.

The DLNA device list includes description information of a DLNA device inside the home network, for example, information such as an IP address of the DLNA device inside the home network and the type of an executable media service. Optionally, DLNA device lists of different home networks may be stored in the user interface server separately, and an identity of the home network may be used to identify a corresponding DLNA device list.

102: The first DLNA device receives a DLNA device list of the home network where the first DLNA device is located and a control script corresponding to the media service to be executed that are sent by the user interface server in response to the service request.

The control script can be used by the first DLNA device, to control the media service to be executed. Optionally, the control script may be written by JavaScript or other script languages, which is not limited in the embodiment of the present invention.

103: The first DLNA device selects a second DLNA device from the DLNA device list, where the second DLNA device is capable of executing the media service to be executed.

Optionally, selecting the second DLNA device from the DLNA device list specifically includes:

selecting the second DLNA device from the DLNA device list at the first DLNA device in a manual selection manner; or selecting, by the first DLNA device according to a preset policy, the second DLNA device from the DLNA device list.

For example, the device list may be displayed on a man-machine interface (for example, a display) of the first DLNA device, and the manipulator of the first DLNA device may select the second device through clicking or checking.

For another example, when there are multiple DLNA devices capable of executing the media service to be executed, the preset policy may be selecting a DLNA device with the highest priority as the second DLNA device. For example, it is assumed that the media service to be executed is music playing, and a DLNA device capable of playing music in the home network has a moving picture experts group audio layer III (full name: Moving Picture Experts Group Audio Layer III, MP3 for short) player, a mobile phone, a computer, and a television. The MP3 player has the highest priority, and the MP3 player is selected as the second DLNA device according to the preset policy. Of course, the preset policy may be others, for example, the computer may be fixedly selected as the second DLNA device for the media service of music playing.

104: The first DLNA device controls, according to the control script, the second DLNA device to execute the media service to be executed.

In this embodiment, the first DLNA device controls the media service inside the home network by using the device list and the control script provided by the user interface server outside the home network, and a DMCA function does not need to be configured for the DLNA device inside the home network, thereby reducing technical requirements on the DLNA device inside the home network, and reducing costs and expenses.

Figure 2:
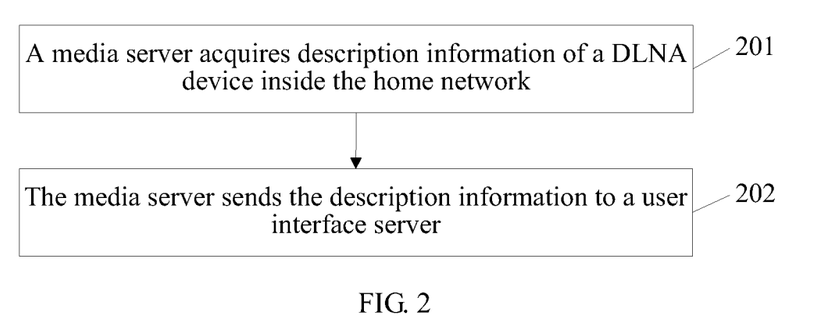
FIG. 2 is a flow chart of a method for generating a DLNA device list and a control script in Embodiment 1 of the present invention.

Another embodiment of the present invention further provides a method for generating a DLNA device list and a control script. As shown in FIG. 2, the method includes the following steps.

201. A media server acquires description information of a DLNA device inside a home network.

Optionally, that a media server acquires description information of a DLNA device inside a home network may be:

the media server sends a multicast message to the DLNA device inside the home network, so that the DLNA device returns a response message after receiving the multicast message, where the response message carries the description information of the DLNA device; and the media server receives the response message sent by the DLNA device, and acquires the description information from the response message.

Or, that a media server acquires description information of a DLNA device inside a home network may be:

the media server receives a notification message sent by the DLNA device, where the notification message carries the description information of the DLNA device; and acquires the description information from the notification message.

The method for transmitting the multicast message, response message, and notification information may be a transmission method specified by a universal plug and play (full name: The Universal Plug and Play, UPnP for short) protocol. The transmission method is based on the simple service discovery protocol (full name: Simple Service Discovery Protocol, SSDP for short), and the media server may send, according to the specification of the SSDP protocol, an "ssdp:discover" multicast message to an SSDP port at a specific multicast address through an M-SEARCH method. When the DLNA device intercepts the message, the DLNA device sends the response message in a unicast manner. The DLNA device may also send an "ssdp:alive" notification message to an SSDP port at a specific multicast address through a NOTIFY method, and the media server intercepts the notification messages.

202: The media server sends the description information to a user interface server, so that the user interface server generates a device list of the home network and a control script according to the description information.

In this embodiment, a media server outside the home network acquires the description information of the device inside the home network, and sends the description information to the user interface server outside the home network, so that the user interface server generates the device list and the control script according to the description information, thereby facilitating development and deployment and centralized control of services of an operator, and reducing costs and expenses.

Figure 3:
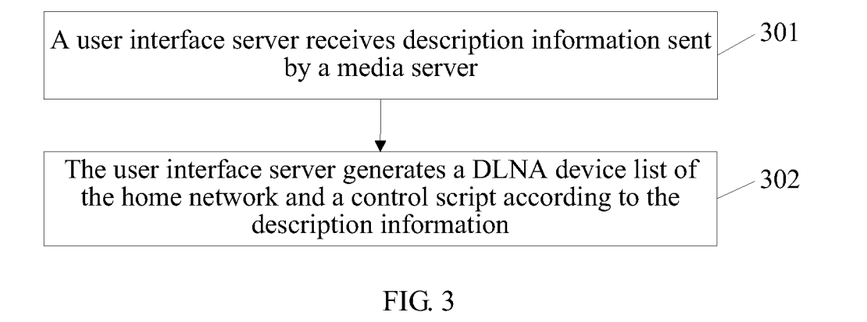
FIG. 3 is a flow chart of a method for generating a DLNA device list and a control script in Embodiment 1 of the present invention.

Another embodiment of the present invention further provides a method for generating a DLNA device list and a control script. As shown in FIG. 3, the method includes the following steps.

301. A user interface server receives description information sent by a media server, where the description information is description information of DLNA devices belonging to the same home network.

302: The user interface server generates a DLNA device list of the home network and a control script according to the description information, where the control script is used to provide a service control function for the DLNA device inside the home network.

Optionally, the DLNA device list of the home network and the control script may be generated through a web technology, and stored in the user interface server, and the control script file may be implemented by the Java Script language.

In this embodiment, the user interface server outside the home network is configured to directly provide the DLNA device list and a service control script for a device inside the home network, so that a service control capability does not need to be configured for the DLNA device inside the home network, thereby reducing technical requirements and dependence of an operator service on the device of the internal network at home, and reducing costs and expenses.

The embodiment of the present invention provides the method for implementing service control of a home network device. The device outside the home network provides the device list and a service control script for the DLNA device inside the home network to implement a service control capability of the DLNA device inside the home network, thereby reducing technical requirements and dependence of an operator service on the device of the internal network at home, facilitating development and deployment and centralized control of services of an operator, and reducing costs and expenses.

Figure 4:
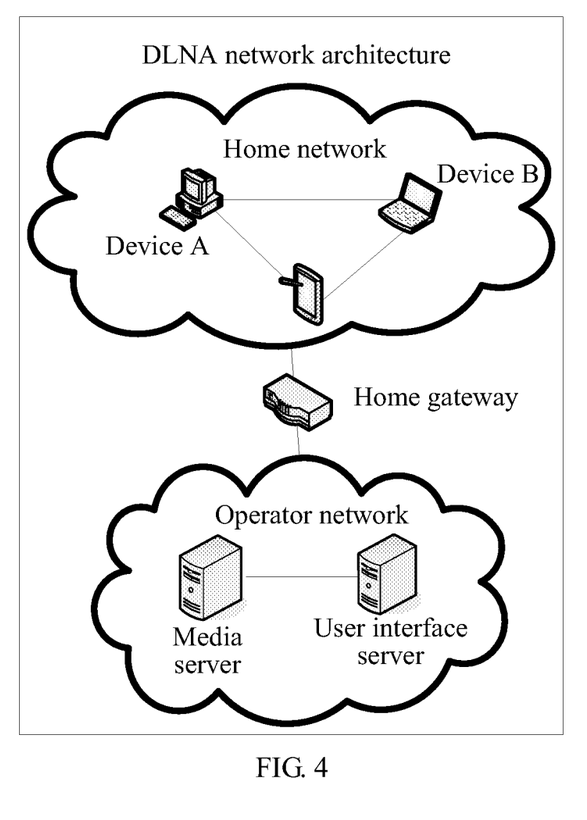
FIG. 4 is a constitutional block diagram of DLNA network architecture in Embodiment 2 of the present invention.

Another embodiment of the present invention provides a method for implementing service control of a home network device, which may be, but not limited to, applied to a DLNA network shown in FIG. 4. The DLNA network includes device A, device B, a media server, and a user interface server. Device A and device B are set in a home network, and may be a DLNA device such as a mobile phone, a laptop computer, or a media player. The media server and the user interface server are set in an operator network, where the home network may access an operator network through a home gateway, and the home gateway may work in routing mode or bridge mode, and access the operator network through an asymmetric digital subscriber line (full name: Asymmetric Digital Subscriber Line, ADSL for short), a very high bit rate digital subscriber loop (full name: Very High Bit Rate Digital Subscriber Loop, VDSL for short) or a fiber to the home (full name: Fiber To The Home, FTTH for short).

Figure 5:
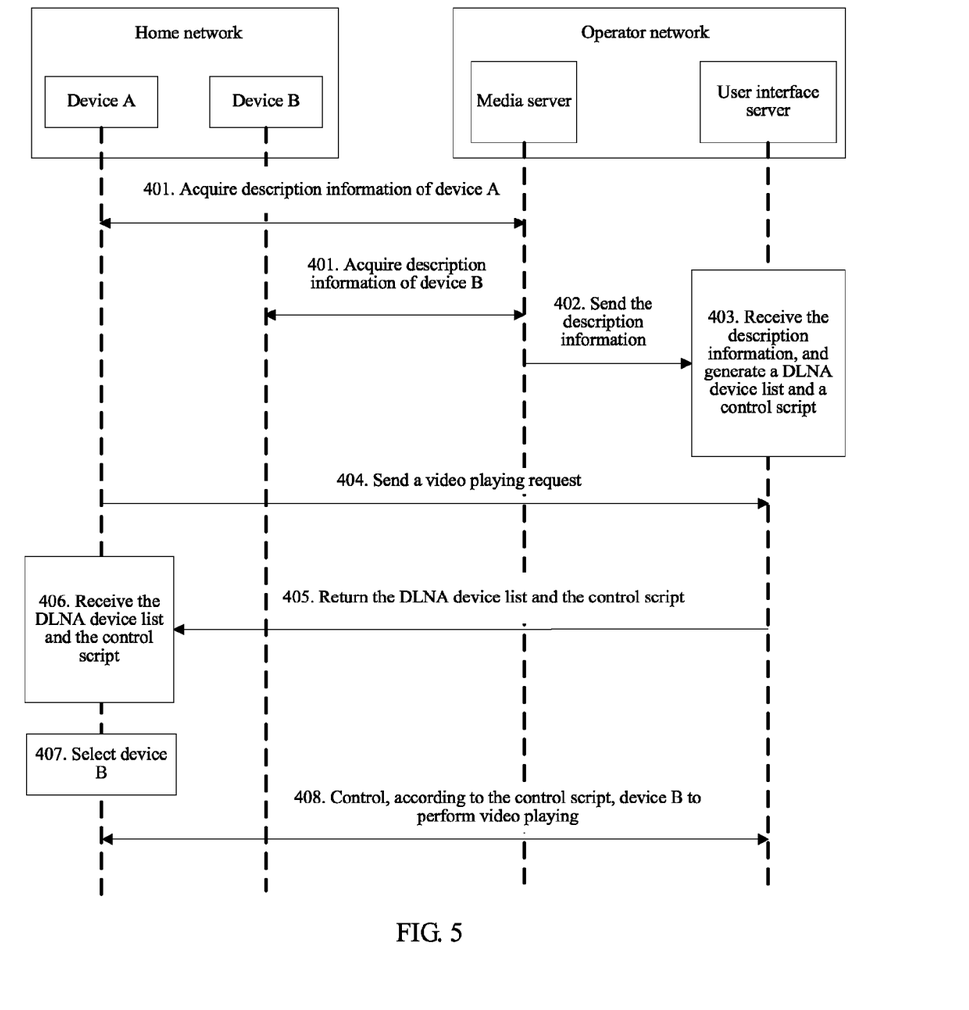
FIG. 5 is an information exchange diagram of implementing service control of a home network device in Embodiment 2 of the present invention.

With a process that a DLNA device in a home network controls other DLNA devices in the home network to display as an example, an information exchange procedure involved in a method according to an embodiment of the present invention is described. As shown in FIG. 5, the procedure includes the following steps.

401: A media server acquires description information of a device inside a home network, where the description information includes a device type, an executable media service type, and address information of device A, and a device type, an executable media service type, and address information of device B.

402: The media server sends the description information to a user interface server.

403. The user interface server receives the description information, and generates a DLNA device list and a control script according to the description information.

404: Device A sends a video playing request to the user interface server.

405: The user interface server returns the DLNA device list and the control script required for implementing video playing to device A according to the video playing request.

406: Device A receives the DLNA device list and the control script.

407: Device A selects a DLNA device capable of playing a video from the DLNA device list, where the DLNA device capable of playing the video in this embodiment is device B.

408: Device A controls, according to the control script, device B to perform video playing.

For example, device A sends a directory query request to the media server, and the media server returns a directory corresponding to a video in the media server according to the directory query request. Device A receives the directory, selects a video to be played from the directory, and acquires corresponding address information. Device A sends a playing command to device B according to the control script, where the playing command carries the address information corresponding to the video to be played.

Device B receives the playing command, acquires the video to be played from the media server according to the address information corresponding to the video to be played, and plays the video.

It should be noted that, device A may acquire the device list and the control script first, or may first acquire the directory corresponding to the video for selection, which is not limited in the embodiment of the present invention.

Figure 6:
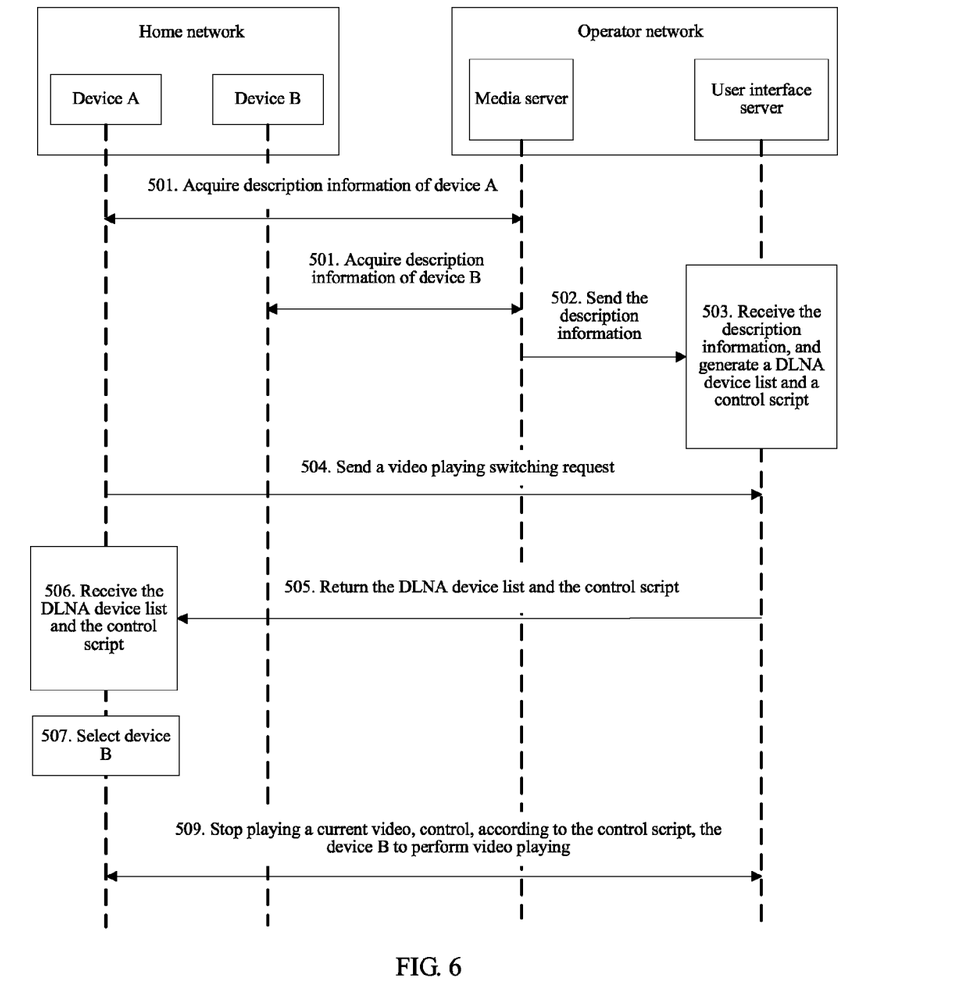
FIG. 6 is an information exchange diagram of implementing service control of a home network device in Embodiment 3 of the present invention.

With a process of implementing media switching between multiple devices in a home network as an example, an information exchange procedure involved in a method according to an embodiment of the present invention is described. As shown in FIG. 6, the procedure includes the following steps.

501: A media server acquires description information corresponding to a device inside a home network, where the description information includes a device type, an executable media service type, and address information of device A, and a device type, an executable media service type, and address information of device B.

502: The media server sends the description information to a user interface server.

503. The user interface server receives the description information, and generates a DLNA device list and a control script according to the description information.

504: Device A sends a video playing switching request to the user interface server when playing a video.

505: The user interface server returns the DLNA device list and the control script required for implementing video playing to device A according to the video playing switching request.

506: Device A receives the DLNA device list and the control script.

507: Device A selects a DLNA device capable of continuing playing the video from the DLNA device list, where the DLNA device capable of continuing playing the video in this embodiment is device B.

508: Device A stops playing a current video, and controls, according to the control script, device B to perform video playing.

For example, device A sends a directory query request to the media server, and the media server returns a directory corresponding to a video in the media server according to the directory query request. Device A receives the directory, and selects a video currently played from the directory and acquires corresponding address information. Device A sends a playing command to device B according to the control script, where the playing command carries the address information and current playing progress corresponding to the video currently played.

Device B receives the playing command, acquires the video currently played from the media server according to the address information corresponding to the video currently played, and continues playing the video according to the current progress of playing.

It should be noted that, device A may acquire the device list and the control script first, or may first acquire the directory corresponding to the video for selection, which is not limited in the embodiment of the present invention.

Device A may stop video playing immediately after selecting device B, or may stop video playing after sending the playing command to device B, which is not limited in the embodiment of the present invention.

It should be noted that, the method for implementing service control of a home network device provided in the embodiment of the present invention may be, but not limited to, applied to a process that a user uses a device in the home network to control other DLNA display devices in the home network to display, and other media services such as audio playing may also adopt this method.

The embodiment of the present invention provides the method for implementing service control of a home network device. The device outside the home network provides the device list and a service control script for the DLNA device inside the home network to implement a service control capability of the DLNA device inside the home network, thereby reducing technical requirements and dependence of an operator service on the device of the internal network at home, facilitating development and deployment and centralized control of services of an operator, and reducing costs and expenses.

Embodiment 4

Figure 7:
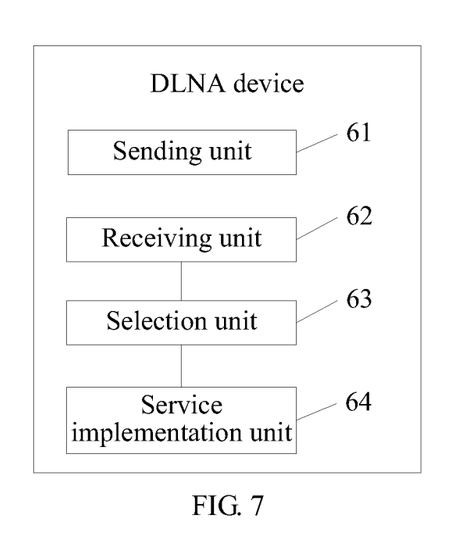
FIG. 7 is a constitutional block diagram of a DLNA device in Embodiment 4 of the present invention.

An embodiment of the present invention provides a DLNA device. As shown in FIG. 7, the device includes a sending unit 61, a receiving unit 62, a selection unit 63, and a service implementation unit 64.

The sending unit 61 is configured to send a service request to a user interface server, where the user interface server is a device outside a home network, and the service request carries a media service to be executed.

The receiving unit 62 is configured to receive a DLNA device list of a home network where a first DLNA device is located and a control script corresponding to the media service to be executed that are sent by the user interface server in response to the service request, where the control script can be used by the first DLNA device, to control the media service to be executed.

The selection unit 63 is configured to select a second DLNA device from the DLNA device list received by the receiving unit 62, where the second DLNA device is capable of executing the media service to be executed.

The service implementation unit 64 is configured to control, according to the control script received by the receiving unit 62, the second DLNA device to execute the media service to be executed.

Figure 8:
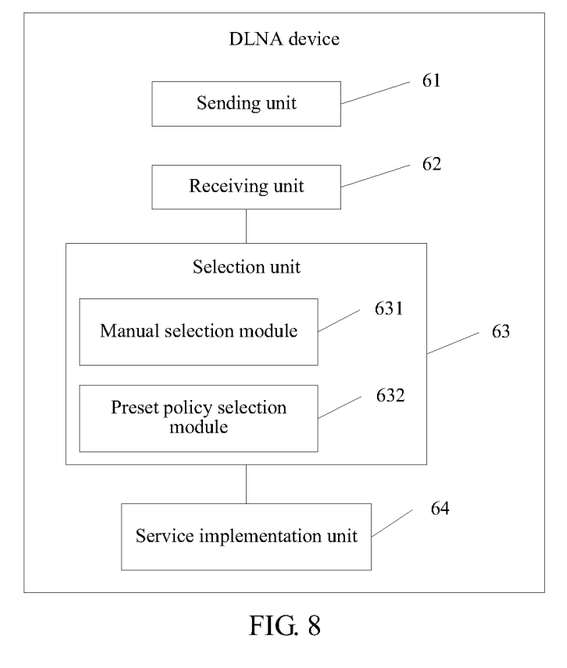
FIG. 8 is a constitutional block diagram of another DLNA device in Embodiment 4 of the present invention.

Optionally, as shown in FIG. 8, the selection unit 63 specifically includes a manual selection module 631 and a preset policy selection module 632.

The manual selection module 631 is configured to select the second DLNA device from the DLNA device list at the first DLNA device in a manual selection manner.

The preset policy selection module 632 is configured to select the second DLNA device from the DLNA device list according to a preset policy.

Figure 9:
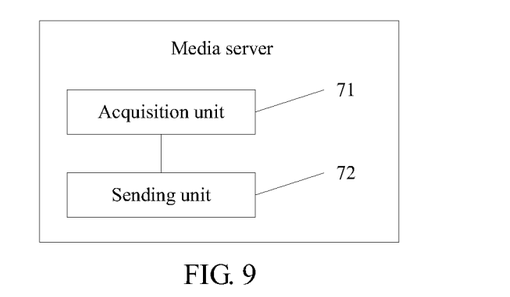
FIG. 9 is a constitutional block diagram of a media server in Embodiment 4 of the present invention.

An embodiment of the present invention provides a media server. As shown in FIG. 9, the apparatus includes an acquisition unit 71 and a sending unit 72.

The acquisition unit 71 is configured to acquire description information of a DLNA device inside a home network.

The sending unit 72 is configured to send the description information acquired by the acquisition unit 71 to a user interface server, so that the user interface server generates a DLNA device list of the home network and a control script according to the description information.

Figure 10:
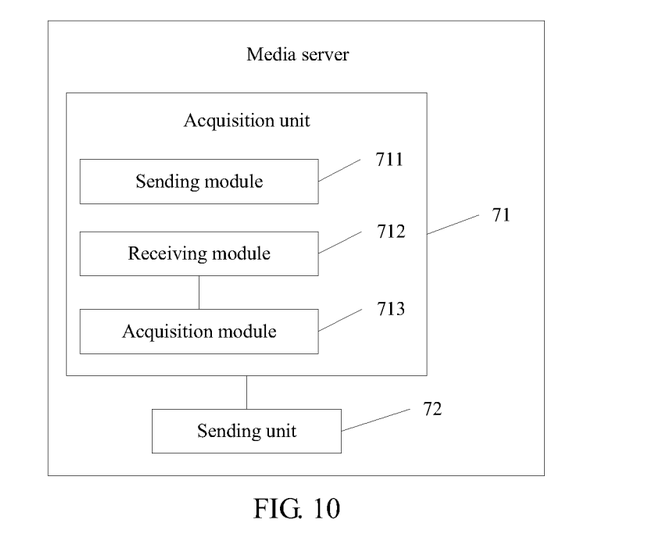
FIG. 10 is a constitutional block diagram of another media server in Embodiment 4 of the present invention.

Optionally, as shown in FIG. 10, the acquisition unit 71 further includes a sending module 711, a receiving module 712, and an acquisition module 713.

The sending module 711 is configured to send a multicast message to the DLNA device inside the home network, so that the DLNA device returns a response message after receiving the multicast message, where the response message carries the description information of the DLNA device.

The receiving module 712 is configured to receive the response message sent by the DLNA device.

The acquisition module 713 is configured to acquire the description information from the response message received by the receiving module 712.

The receiving module 712 is further configured to receive a notification message sent by the DLNA device, where the notification message carries the description information of the DLNA device.

The acquisition module 713 is further configured to acquire the description information from the notification message received by the receiving module 712.

Figure 11:
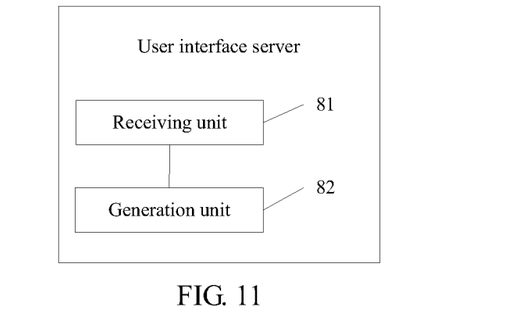
FIG. 11 is a constitutional block diagram of a user interface server in Embodiment 4 of the present invention.

An embodiment of the present invention further provides a user interface server. As shown in FIG. 11, the apparatus includes a receiving unit 81 and a generation unit 82.

The receiving unit 81 is configured to receive description information sent by a media server, where the description information is description information of DLNA devices belonging to the same home network.

The generation unit 82 is configured to generate a DLNA device list of the home network and a control script according to the description information received by the receiving unit 81, where the control script is used to provide a service control function for the DLNA device inside the home network.

Figure 12:
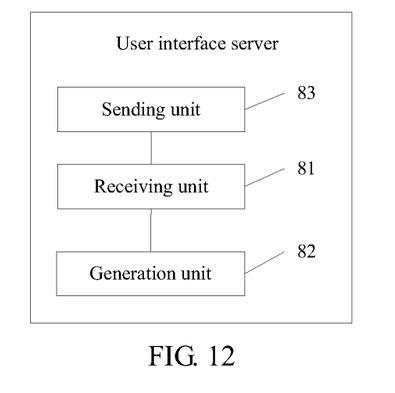
FIG. 12 is a constitutional block diagram of another user interface server in Embodiment 4 of the present invention.

Optionally, as shown in FIG. 12, the apparatus further includes a sending unit 82.

The receiving module 81 is configured to receive a service request sent by the DLNA device inside the home network.

The sending unit 82 is configured to send a DLNA device list of the home network where the DLNA device is located and a control script corresponding to a service type of the service request to the DLNA device according to the service request received by the receiving unit 81.

Figure 13:
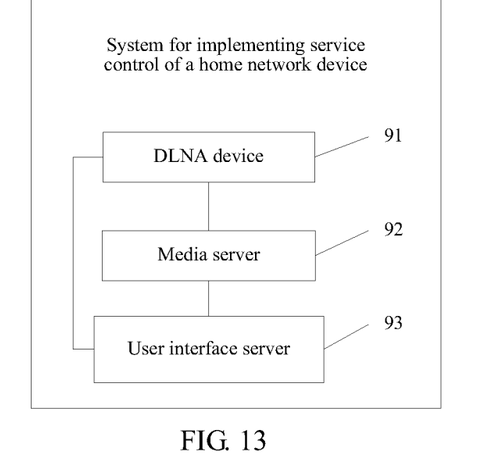
FIG. 13 is a constitutional block diagram of a system for implementing service control of a home network device in Embodiment 4 of the present invention.

An embodiment of the present invention further provides a system for implementing service control of a home network device. As shown in FIG. 13, the system includes a DLNA device 91, a media server 92, and a user interface server 93.

The DLNA device 91 is configured to: send a service request to the user interface server 93, where the DLNA device 91 is any DLNA device inside a home network, the user interface server 93 is a device outside the home network, and the service request carries a media service to be executed; receive a DLNA device list of the home network where the DLNA device 91 is located and a control script corresponding to the media service to be executed that are sent by the user interface server 93 in response to the service request, where the control script can be used by the DLNA device 91, to control the media service to be executed; select a DLNA device capable of executing the media service to be executed from the DLNA device list; and control, according to the control script, the DLNA device capable of executing the media service to be executed to execute the media service to be executed.

The media server 92 is configured to: acquire description information corresponding to the DLNA device 91 inside the home network; and send the description information acquired by the acquisition unit to the user interface server 93, so that the user interface server 93 generates the DLNA device list of the home network and the control script according to the description information.

The user interface server 93 is configured to: receive the description information sent by the media server 92, where the description information is description information of the DLNA devices 91 belonging to the same home network; and generate the DLNA device list of the home network and the control script according to the description information received by the receiving unit, where the control script is used to provide a service control function for the DLNA device 91 inside the home network.

The embodiment of the present invention provides the apparatus and system for implementing service control of a home network device. The device outside the home network provides the device list and a service control script for the DLNA device inside the home network to implement a service control capability of the DLNA device inside the home network, thereby reducing technical requirements and dependence of an operator service on the device of the internal network at home, facilitating development and deployment and centralized control of services of an operator, and reducing costs and expenses.

Through the foregoing description of the embodiments, it is apparent to persons skilled in the art that the present invention may be accomplished by software plus necessary universal hardware, and of course, may also be accomplished by hardware, but in most cases, the present invention is preferably implemented through the former method. Based on such understanding, the technical solutions of the present invention or the part that makes contributions to the prior art can be substantially embodied in the form of a software product. The computer software product is stored in a readable storage medium, for example, a floppy disk, hard disk, or optical disk of the computer, and contains several instructions used to instruct a computer device (for example, a personal computer, a server, or a network device) to perform the methods according to the embodiments of the present invention.

The foregoing description is merely about several embodiments of the present invention, but is not intended to limit the present invention. Various variations and modifications that can be easily thought of by persons skilled in the art without departing from the technical scope of the present invention fall within the scope of the present invention. Therefore, the protection scope of the present invention is subject to the appended claims.

What is claimed is:

1. A method for implementing service control of a home network device, the method comprising:
    sending, by a first digital living network alliance (DLNA) device, description information of the first DLNA device to a user interface server, wherein the first DLNA device is disposed inside a home network, the user interface server is a device outside the home network;
    sending, by the first DLNA device, a service request to the user interface server, wherein the service request carries a media service to be executed;
    receiving, by the first DLNA device, a DLNA device list of the home network where the first DLNA device is located and a control script corresponding to the media service to be executed, the device list and the control script being sent by the user interface server in response to the service request, wherein the DLNA device list and the control script are each generated by the user interface server in response to receiving, and according to, the description information of the first DLNA device and description information of a second DLNA device received at the user interface server, wherein the control script is used by the first DLNA device to control the media service to be executed;
    selecting, by the first DLNA device, the second DLNA device from the DLNA device list, wherein the second DLNA device is capable of executing the media service to be executed; and
    controlling, by the first DLNA device according to the control script, the second DLNA device to execute the media service to be executed by sending a command by the first DLNA device to the second DLNA device, the command including at least first information corresponding to the media service to be executed, wherein the command causes the second DLNA device to acquire, from a media server disposed outside the home network and according to the first information, data of the media service to be executed.

2. The method according to claim 1, wherein selecting the second DLNA device comprises selecting, by the first DLNA device in a manual selection manner, the second DLNA device from the DLNA device list at the first DLNA device.

3. The method according to claim 1, wherein selecting the second DLNA device comprises selecting, by the first DLNA device according to a preset policy, the second DLNA device from the DLNA device list.

4. A first digital living network alliance (DLNA) device, comprising:

a processor; and
a non-transitory computer-readable storage medium coupled to the processor and storing programming instructions for execution by the processor, the programming instructions instruct the processor to:
    send description information of the first DLNA device to a user interface server, wherein the user interface server is a device outside a home network;
    send a service request to the user interface server, wherein the service request carries a media service to be executed;
    receive a DLNA device list of a home network where the first DLNA device is located and a control script corresponding to the media service to be executed, the device list and the control script being sent by the user interface server in response to the service request, wherein the DLNA device list and the control script are each generated by the user interface server in response to receiving, and according to, the description information of the first DLNA device and description information of a second DLNA device received at the user interface server, wherein the control script is used by the first DLNA device to control the media service to be executed;
    select the second DLNA device from the DLNA device list, wherein the second DLNA device is capable of executing the media service to be executed; and
    control, according to the control script, the second DLNA device to execute the media service to be executed by sending a command from the first DLNA device to the second DLNA device, the command including at least first information corresponding to the media service to be executed, wherein the command causes the second DLNA device to acquire, from a media server disposed outside the home network and according to the first information, data of the media service to be executed.

5. The device according to claim 4, wherein the programming instructions instruct the processor to:
    select the second DLNA device from the DLNA device list at the first DLNA device in a manual selection manner; or
    select the second DLNA device from the DLNA device list according to a preset policy.

6. A media server, comprising:
a processor; and
a non-transitory computer-readable storage medium coupled to the processor and storing programming instructions for execution by the processor, the programming instructions instruct the processor to:
    acquire description information corresponding to a first digital living network alliance (DLNA) device inside a home network;
    acquire description information of a second DLNA device that is separate from the first DLNA device and inside the home network;
    send the description information of the first DLNA device and the description information of the second DLNA device to a user interface server and cause the user interface server to generate a DLNA device list and a control script according to the description information of the first DLNA device and description information of the second DLNA device;
    sending, to the second DLNA device that is selected at the first DLNA device from the DLNA device list and that is inside the home network, data of the media service to be executed in response to the media server receiving a request from the second DLNA device that is sent by the second DLNA device in response to the second DLNA device receiving a command from the first DLNA device according to the control script, the command including at least first information corresponding to the media service to be executed.

7. The media server according to claim 6, wherein the programming instructions instruct the processor to:
send a multicast message to a DLNA device inside the home network, wherein the DLNA device is the first DLNA device or the second DLAN device;
receive a response message sent by the DLNA device, wherein the response message carries the description information of the DLNA device; and
acquire the description information from the response message.

8. The media server according to claim 6, wherein the programming instructions further instruct the processor to:
receive a notification message sent by a DLNA device, wherein the notification message carries the description information of the DLNA device, wherein the DLNA device is the first DLNA device or the second DLAN device; and
acquire the description information from the notification message.

9. A user interface server, comprising:
a processor; and
a non-transitory computer-readable storage medium coupled to the processor and storing programming instructions for execution by the processor, the programming instructions instruct the processor to:
receive description information sent by a media server, wherein the description information is description information of each device of digital living network alliance (DLNA) devices belonging to a same home network, the DLNA devices including a first DLNA device that that is inside the home network and a second DLNA device that is separate from the first DLNA device and that is inside the home network;
generate a DLNA device list of the home network and a control script according to, and in response to receiving, the description information, wherein the control script is used to provide a service control function for the first DLNA device to control the second DLNA device, and wherein the DLNA device list includes the first DLNA device and the second DLNA device;
receive a service request sent by the first DLNA device inside the home network, wherein the service request carries a media service to be executed;
send the DLNA device list and the control script corresponding to the media service to be executed to the first DLNA device according to the service request in response to receiving the service request, wherein the control script enables the first DLNA device to send a command from the first DLNA device to the second DLNA device, the command including at least first information corresponding to the media service to be executed, wherein the command causes the second DLNA device to acquire, from the media server and according to the first information, data of the media service to be executed.

10. A system for implementing service control of a home network device, comprising:
a first DLNA device;
a media server; and
a user interface server;
wherein the first DLNA device is configured to:
send description information of the first DLNA device to the media server, wherein the first DLNA device is disposed inside a home network, and the user interface server and the media server are devices outside the home network;
send, by the first DLNA device, a service request to the user interface server, wherein the service request carries a media service to be executed;
receive a DLNA device list of the home network where the first DLNA device is located and a control script corresponding to the media service to be executed that are sent by the user interface server in response to the service request, wherein the control script is used by the first DLNA device to control the media service to be executed;
select a second DLNA device capable of executing the media service to be executed from the DLNA device list; and
control, according to the control script, the second DLNA device capable of executing the media service to be executed by sending a command from the first DLNA device to the second DLNA device, the command including at least first information corresponding to the media service to be executed, wherein the command causes the second DLNA device to acquire, from the media server and according to the first information, data of the media service to be executed;
wherein the media server is configured to:
acquire the description information of the first DLNA device and description information of the second DLNA device; and
send the description information of the first DLNA device and the description information of the second DLNA device to the user interface server;
wherein the user interface server is configured to:
receive the description information of the first DLNA device and the description information of the second DLNA device sent by the media server;
generate the DLNA device list of the home network and the control script according to, and in response to receiving, the description information of the first DLNA device and the description information of the second DLNA device, wherein the control script provides a service control function for the first DLNA device to control the second DLNA device;
receive the service request sent by the first DLNA device;
send the DLNA device list and the control script to the first DLNA device in response to receiving the service request; and
wherein the media server is further configured to send, to the second DLNA device, the data of the media service to be executed in response to the media server receiving a request from the second DLNA device that is sent by the second DLNA device in response to the second DLNA device receiving the command from the first DLNA device according to the control script.

* * * * *